(12) United States Patent
Patsouris et al.

(10) Patent No.: US 10,577,972 B2
(45) Date of Patent: Mar. 3, 2020

(54) ASSEMBLY CONSISTING OF A BEARING SUPPORT AND BEARINGS OF A ROTOR SHAFT IN A TURBOMACHINE

(71) Applicant: SAFRAN AIRCRAFT ENGINES, Paris (FR)

(72) Inventors: Emmanuel Pierre Dimitri Patsouris, Moissy Cramayel (FR); Arnaud Nicolas Negri, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 22 days.

(21) Appl. No.: 16/142,034

(22) Filed: Sep. 26, 2018

(65) Prior Publication Data
US 2019/0093508 A1 Mar. 28, 2019

(30) Foreign Application Priority Data

Sep. 27, 2017 (FR) ...................... 17 58954

(51) Int. Cl.
*F01D 25/16* (2006.01)
*F01D 25/18* (2006.01)
*F02C 7/06* (2006.01)

(52) U.S. Cl.
CPC ........... *F01D 25/162* (2013.01); *F01D 25/18* (2013.01); *F02C 7/06* (2013.01); *F05D 2220/36* (2013.01);
(Continued)

(58) Field of Classification Search
CPC .......... F01D 25/162; F01D 25/18; F02C 7/06; F05D 2220/36; F05D 2240/14;
(Continued)

(56) References Cited

U.S. PATENT DOCUMENTS

| 4,428,713 A | 1/1984 | Coplin et al. |
| 4,704,862 A * | 11/1987 | Dennison ................. F01D 7/00 416/162 |

(Continued)

FOREIGN PATENT DOCUMENTS

| FR | 2 896 827 A1 | 8/2007 |
| FR | 3 005 099 A1 | 10/2014 |

(Continued)

OTHER PUBLICATIONS

Preliminary Search Report dated May 24, 2018 in French Patent Application No. 1758954 (with English translation of Category of Cited Documents), 8 pages.

(Continued)

*Primary Examiner* — Igor Kershteyn
(74) *Attorney, Agent, or Firm* — Oblon, McClelland, Maier & Neustadt, L.L.P.

(57) ABSTRACT

An assembly for a turbomachine including a shaft of a rotor of a turbomachine, and at least two bearings allowing at least one portion of the shaft to be supported, including a bearing support configured to be connected to a casing of the turbomachine which extends between the internal rings of the bearings while being mounted thereon, as well as a bearing connector which is connected to the shaft of the rotor and which is mounted on the external rings of the bearings while extending between them, the bearing support and the bearing connector being common to the two bearings and delimiting together at least partially an oil circulation housing common to the two bearings.

12 Claims, 3 Drawing Sheets

(52) U.S. Cl.
CPC ...... *F05D 2240/14* (2013.01); *F05D 2240/50* (2013.01); *F05D 2240/60* (2013.01); *F05D 2250/36* (2013.01); *F05D 2260/98* (2013.01)

(58) Field of Classification Search
CPC ............. F05D 2240/50; F05D 2240/60; F05D 2250/36; F05D 2260/98
See application file for complete search history.

(56) References Cited

U.S. PATENT DOCUMENTS

| | | | | |
|---|---|---|---|---|
| 7,594,404 B2* | 9/2009 | Somanath | ............. | F01D 25/162 415/213.1 |
| 7,677,047 B2* | 3/2010 | Somanath | ............. | F01D 25/162 415/142 |
| 7,775,049 B2* | 8/2010 | Kumar | ................... | F01D 25/24 60/796 |
| 7,802,962 B2* | 9/2010 | Sjoqvist | ................ | F01D 25/162 415/142 |
| 8,245,518 B2* | 8/2012 | Durocher | ................ | F01D 9/065 415/142 |
| 8,572,943 B1* | 11/2013 | Sheridan | ................... | F02C 7/06 60/39.08 |
| 2013/0192199 A1* | 8/2013 | Merry | ..................... | F01D 25/16 60/226.1 |
| 2016/0312696 A1* | 10/2016 | Sheridan | ................ | F01D 25/16 |

FOREIGN PATENT DOCUMENTS

| | | | |
|---|---|---|---|
| WO | WO 2015/094607 A1 | 6/2015 | |
| WO | WO 2017/158296 A1 | 9/2017 | |

OTHER PUBLICATIONS

Extended European Search Report dated Jan. 28, 2019 in European Patent Application No. 18306267.8 (with English translation of Category of Cited Documents), 8 pages.

* cited by examiner

ASSEMBLY CONSISTING OF A BEARING SUPPORT AND BEARINGS OF A ROTOR SHAFT IN A TURBOMACHINE

FIELD OF THE INVENTION

The present invention relates to an assembly comprising bearings of a rotor shaft and a bearing support, within a turbomachine, and most particularly within a turbofan.

PRIOR ART

In the case of a turbomachine of turbofan type, the latter generally comprises, from upstream to downstream in the gas flow direction, a ducted fan accommodated in a fan casing, a primary annular flow space and a secondary annular flow space. The mass of air aspired by the fan is therefore divided into a primary flow, which circulates in the primary flow space, and a secondary flow, which is concentric with the primary flow and circulates in the secondary flow space.

The primary flow space passes through a primary body comprising one or more compressor stages, for example a low-pressure compressor and a high-pressure compressor, a combustion chamber, one or more turbine stages, for example a high-pressure turbine and a low-pressure turbine, and a gas exhaust nozzle.

Typically, the high-pressure turbine drives the high-pressure compressor in rotation by means of a first shaft, called the high-pressure shaft, while the low-pressure turbine drives the low-pressure compressor and the fan in rotation by means of a second shaft, called the low-pressure shaft. The low-pressure shaft is generally accommodated in the high-pressure shaft, said shafts being supported and guided in rotation by bearings attached to the structural portions of the turbojet.

To improve the propulsive efficiency of the turbojet and to reduce its specific consumption as well as the noise emitted by the fan, turbojets have been proposed having high bypass ratios, which correspond to the ratio between the flow rate of the secondary (cold) flow and the flow rate of the primary (hot) flow which passes through the primary body.

To attain such bypass ratios, the fan is decoupled from the low-pressure turbine, thus allowing their respective rotations speeds to be independently optimized. For example, the decoupling can be accomplished by means of a reducer such as a planetary gear reduction mechanism or a star gear reduction mechanism, placed between the upstream end (with respect to the gas flow direction in the turbojet) of the low-pressure shaft and the fan. The fan is then driven by the low-pressure shaft by means of the reduction mechanism and a supplementary shaft, called the fan shaft, which is attached between the reduction mechanism and the fan disk.

This decoupling thus allows the rotation speed and the fan pressure ratio to be reduced, and an increase in the speed of the low-pressure turbine. A higher low-pressure turbine speed allows an increase in the effectiveness of the low-pressure turbine per stage and thus a reduction in the number of stages of the low-pressure turbine. Thanks to the reduction mechanism, the low-pressure turbine can turn at higher rotation speeds than in conventional turbojets.

The high-pressure and low-pressure shafts are connected to the structural portions of the turbojet by means of bearings, the bearings themselves being supported by their respective bearing supports.

The turbojet further conventionally comprises gearing configured to collect power from the high-pressure shaft.

These different bearings, as well as the reduction mechanism and the gearing, must be lubricated and cooled. To this end, the turbojet generally comprises a lubrication unit supplying a closed oil circuit, housings in which the oil circulates, allowing the rolling elements of the bearings, the reduction mechanism and the gearing to function, as well as the apparatus comprising in particular the spray nozzles configured to inject oil into the housing and recovery pumps configured to recycle the oil which was injected into the housings.

In practice, each piece of equipment (that is each bearing and the reduction mechanism) is accommodated in a lubrication housing with which a set of apparatus is associated, i.e. in particular a spray nozzle and an oil recovery pump.

It is obligatory in particular to provide one housing per piece of equipment in the case where the bearings are separated by a journal, the latter having a structure such that it cannot be contained in a housing. Document FR2896827 describes in particular an assembly of a turbine shaft with a compressor shaft journal.

The bearings are equipped with an inner ring and an outer ring, coaxial with the axis X of the turbojet. Rolling elements are interleaved between the outer ring and the inner ring of the bearing and allow the rotation of the shaft supported by the bearing. The bearings are disposed in the lubrication housings of which the shape is substantially annular. The high- and low-pressure shafts are located in the center of the turbomachine and are surrounded by the structural elements thereof. The outer ring of the bearings is mounted on the structural elements of the turbojet, particularly different casings, and is fixed with respect to said structural elements, while the inner ring of the bearings is attached to rotating parts of the turbojet, particularly shafts, and is therefore movable in rotation around its axis.

The pieces of equipment accommodated in the housings are lubricated and cooled by oil which is projected into the housing by spray nozzles so as to form a fog of droplets in suspension. The lubrication housings restrain the oil around the equipment to be lubricated, so as to avoid oil pouring into other sectors of the turbomachine where it could catch fire or risk useless pollution, and so as to be able to recover a maximum of oil for reuse. The lubrication housing is delimited over its entire periphery by casing walls, shaft walls, or sealing means disposed between these walls. These sealing means are cross section restrictions which limit the passage of gasses and of fluids and are pressurized from the exterior of the housing. This pressurization induces the passage of an airflow from the exterior to the interior of the housing, which drives oil through the sealing means toward the interior of the housing, thus allowing the maximum of oil to be retained in the interior thereof.

One oil recovery pump is provided per housing for discharging a volume of oil equivalent to that which is injected into the housing via spray nozzles.

The schematic drawing of FIG. 1A illustrates a conventional arrangement from the prior art of the elements previously described.

With reference to FIG. 1A, the assembly comprises a rotor shaft 4 with axis X parallel to the axis of the turbojet in which it is designed to be mounted, as well as a journal 41 mounted on the shaft which ensures coupling of the rotor shaft 4 and the rotor 3 itself. Bearings 10a, 10b are mounted on either side of the journal 41 along the axis X, allowing the support and guidance of the shaft 4.

The bearings 10a, 10b are provided with coaxial internal ring 11 and external ring 12 and between them are mounted rolling elements 13. Preferably, the upstream bearing 10a is a roller bearing, and the downstream bearing 10b is a ball bearing.

Hereafter in the description, the terms "internal" and "external" will be used to define the position or the distance of an element to which they pertain, with respect to the axis X of the rotor shaft. An "internal" element is thus closer to the axis X than an "external" element which is farther away from it.

As regards the bearings 10a, 10b, they are mounted by their internal ring 11 on the rotor shaft 4, and by their external ring 12 on their respective bearing support 22a, 22b which connects said bearing to a casing 30a, 30b of the turbojet so as to ensure the attachment of the bearing to the casing.

Each of the two bearings 10a, 10b is accommodated in a respective housing 35a, 35b, the two housings being distinct from one another. The inner space of the housings 35a, 35b is represented by a pointed pattern in FIG. 1A. Each of the housings form an annulus separated axially around the shaft 4.

In this configuration, the housings 35a, 35b are located on either side of the journal 41 (along the axis X) and separated by the journal.

The two casings 30a, 30b are distinct from one another, and are attached to one another at the exterior of rotor 3.

These two casings 30a, 30b thereupon risk becoming misaligned from one another due to the necessary manufacturing tolerances, assembly clearance and differential dilations during operation.

Moreover, the fact that the bearings 10a, 10b, connected to the same rotor 3, are connected to two different casings 30a, 30b inevitably causes a concentricity fault between these two bearings. This concentricity fault between the two bearings 10a, 10b causes strong pre-stresses in the rotor 3 and very strong loads in the bearings. This concentricity fault can also make the assembly of the rotor 3 with the bearings 10a, 10b impossible.

Furthermore, the fact that each bearing is accommodated in a housing which belongs to it implies providing as much apparatus, that is as many spray nozzles, oil recovery pumps and even seals as there are pieces of equipment, which causes a strong increase in bulk, in mass, as well as in operating costs of the turbojet.

In the particular case of FIG. 1A, it is thus necessary to provided two sets of apparatus, or in particular two oil feeds, two oil recoveries and at least two seals.

DISCLOSURE OF THE INVENTION

The invention therefore has as its aim to correct the disadvantages of the prior art by proposing an assembly for turbomachines, the arrangement of its constitutive elements allowing the avoidance of a concentricity fault between two bearings connected to the same rotor.

The invention also aims to propose an assembly for turbomachines as describe previously, in which a journal, in particular the journal of the low-pressure compressor and the journal of the low-pressure turbine, is mounted between two bearings of a shaft of the turbomachine, so as to maximize the radial displacement or the tilting of the rotor, while improving the vibrational dynamics within the turbomachine.

Another aim of the invention is to reduce the number of oil housings customarily required for supplying the bearings supporting the high-pressure and low-pressure shafts of the turbomachine with oil.

The invention aims in particular to allow several bearings to be supplied with oil by the same oil circulation housing.

Another aim of the invention is to reduce the number of apparatus necessary for the circulation of oil in the housings, compared to what exists.

Another aim of the invention is to propose a turbomachine comprising such an assembly, and in which the number of apparatus for the circulation of oil, the bulk in the interior of the turbomachine and the costs of operation of the turbomachine are strongly reduced compared to existing turbomachines.

To this end, according to a first aspect, the invention proposes an assembly comprising:
- a turbomachine rotor shaft, and
- at least two bearings allowing at least one portion of said shaft to be supported,
- characterized in that it comprises a bearing support configured to be connected to a casing of the turbomachine and which extends between the internal rings of the bearings while being mounted thereon as well as a bearing connector which is connected to the rotor shaft and which is mounted on the external rings of the bearing while extending between them, the bearing support and the bearing connector being common to the two bearings and delimiting together at least partly an oil circulation housing common to the two bearings.

In this manner, reversing the positions of the shaft and of the bearing support compared to the prior art allows a concentricity fault to be avoided between the bearings of the same rotor shaft, because said bearings are connected to the same casing.

Moreover, the preceding assembly for turbomachines allows the bearings to be integrated into the same single housing, thus reducing significantly the number of housings accommodating the bearings, and hence the number of apparatus ensuring the circulation of oil in the housings, which makes it possible to reduce the internal bulk of the turbojet, as well as the mass and by extension the costs of operation of the turbojet.

Very clearly, the assembly can comprise more than two bearings. The bearings can also be ball bearings, roller bearings or any other type of bearing adapted to the operation of the assembly, without preference.

According to other aspects, the proposed assembly has the following different features, taken alone or according to their technically possible combinations:
- the bearing connector appears in the form of a flange which extends along and around the rotor shaft while widening, so that the common bearing support is located between the bearing connector and the rotor shaft;
- the bearing connector is designed to be coupled to a rotor by means of a journal mounted around the housing, which extends from a portion of the bearing connector located between the two bearings; hence the journal is mounted between the two bearings, which allows maximizing the radial displacement or the tilting of the rotor, while improving the vibrational dynamics of the turbomachine;
- the common bearing support is configured to be connected to a casing of the turbomachine which is common to the bearings;
- the bearing connector is a bearing connector of a low-pressure shaft of a low-pressure compressor of a turbomachine, and the bearings are low-pressure bearings allowing said bearing connector of the low-pressure shaft of the low-pressure compressor of the turbomachine to be supported;

the bearing support is configured to be connected to a casing which is an inlet casing or an inter-compressor casing of a turbomachine;

the bearing connector is a bearing connector of a low-pressure shaft of a low-pressure turbine of a turbomachine, and the bearings are low-pressure bearings allowing the support of said bearing connector of the low-pressure shaft of the low-pressure turbine of the turbomachine;

the bearing support is configured to be connected to a casing which is an exhaust casing or an inter-turbine casing of a turbomachine;

the assembly further comprises a reduction mechanism configured to couple the low-pressure shaft of the low-pressure compressor with the fan shaft, the common housing accommodating the low-pressure bearings supporting the low-pressure shaft of the low-pressure compressor, the fan bearing(s) supporting the fan and the reduction mechanism;

the assembly further comprises a high-pressure shaft of a high-pressure turbine supported by at least one high-pressure bearing, the common housing accommodating the low-pressure bearing supporting the low-pressure shaft of the low-pressure turbine and the high-pressure bearing(s) supporting the high-pressure shaft of the high-pressure turbine;

The invention also proposes a turbomachine comprising at least one preceding assembly. The turbomachine is preferably a turbofan.

DESCRIPTION OF THE FIGURES

Other advantages and disadvantages of the invention will appear upon reading the description that follows, given by way of an illustrative and nonlimiting example, with reference to the appended Figures which show.

DETAILED DESCRIPTION OF THE INVENTION

Figure 1A:
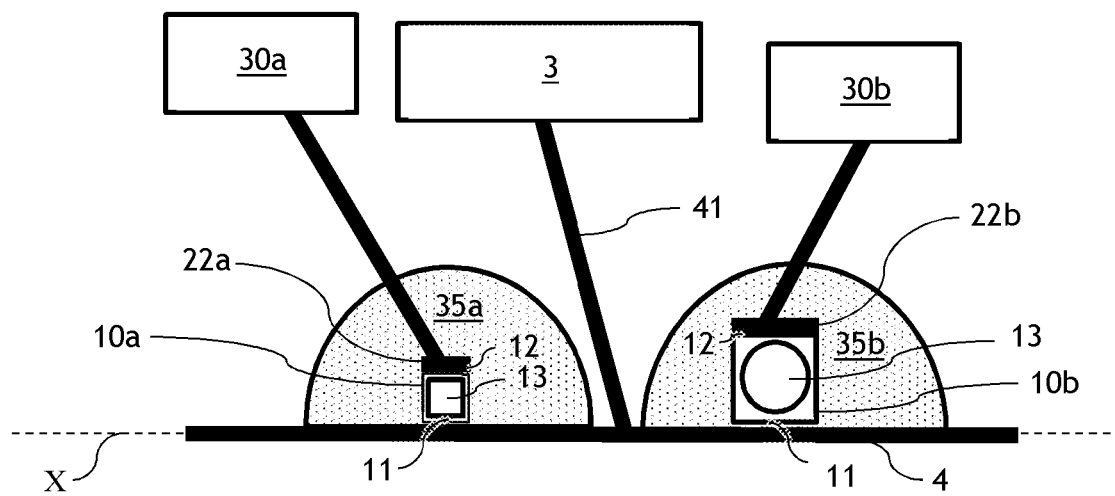
FIG. 1A, a schematic drawing of an assembly comprising two bearings supporting a rotor shaft according to the prior art.
Figure 1B:
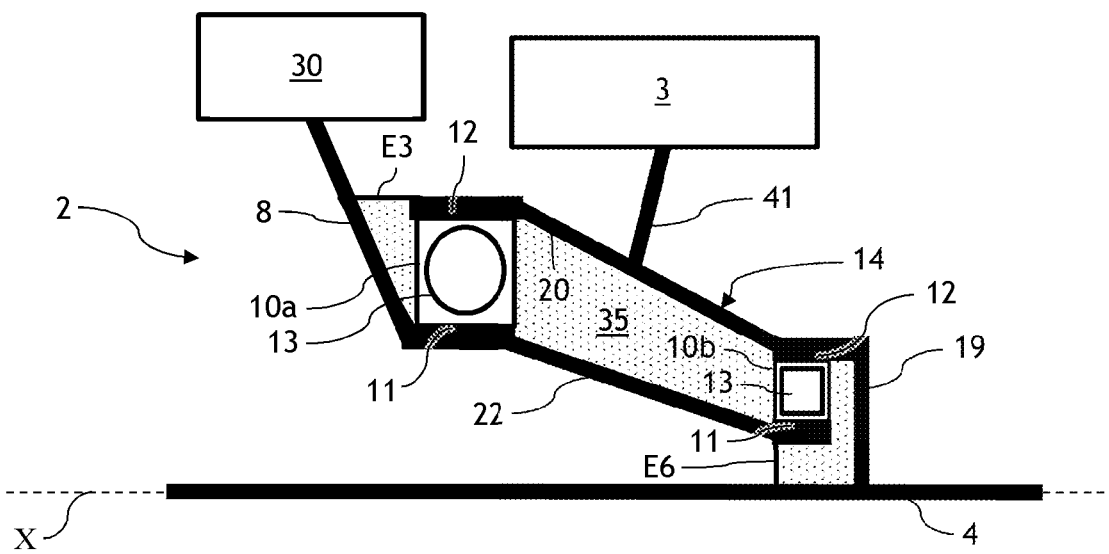
FIG. 1B, a schematic drawing of an assembly of two bearings supporting a bearing connector connected with a rotor shaft according to the invention.

The elements common to FIGS. 1A and 1B bear the same labels.

With reference to FIG. 1B, the assembly 2 comprises a shaft 4 comprising a bearing connector 14. The latter appears advantageously in the form of a flange which extends along and around the shaft 4 while widening from it. The bearing connector 14 of the shaft forms advantageously a pin 19 which extends radially toward the exterior of the shaft and which continues while widening at a free end 20.

It will be understood that the structure of the bearing connector 14 of the shaft is not limited to that shown in FIG. 1B. It will be possible for example to provide that, over at least one portion, the bearing connector extends parallel to the shaft 4.

The bearing connector 14 can be integral with the shaft 4 or appear in the form of a part capable of being connected to the shaft 4.

Two bearings are mounted on the bearing connector 14, the upstream bearing 10a in proximity to the free end 20, and the downstream bearing 10b in proximity to the pin 19 of the bearing connector 14.

The bearings 10a, 10b are mounted by their external ring 12 to the bearing connector 14, and by their internal ring 11 to a bearing support 22 common to the two bearings. The bearing support 22 extends between the two bearings 10a, 10b so as to connect said bearings, and is continued by a flange 8 ensuring the coupling of the bearing support 22 to a casing 30 of the turbomachine.

Thus, the two bearings 10a, 10b are mounted, by means of the common bearing support 22, to a single casing 30 common to the two bearings.

The bearing connector 14 and the bearing support 22 define an oil circulation housing 35, including seals E3 and E6, in which are accommodated the two bearings 10a, 10b. In other words, the housing 35 is common here to the two bearings, said bearings hence being located between the bearing connector 14 of the shaft and the bearing support 22. The inner space of the housing 35 is shown by a pointed pattern in FIG. 1B.

In this configuration, the journal 41 is located around the housing 35 and extends radially from a portion of the bearing connector 14 located between the two bearings 10a, 10b.

This arrangement allows accommodating the two bearings 10a, 10b in a housing 35, and connecting the two bearings to a casing 30 through a bearing support 22, the housing 35, the casing 30 and the bearing support 22 each being unique and common to the two bearings.

If it is desired that the housing 35 contains only the two bearings 10a, 10b, it is necessary to provide a first seal E3 (also shown in FIG. 2) between the bearing connector 14 and the flange 8, as well as another seal E6 between the bearing support 22 and the shaft 4.

Hence a single set of apparatus is necessary for all the bearings of the housing, or in particular a single oil supply, a single oil recovery, and a single seal.

Figure 2:
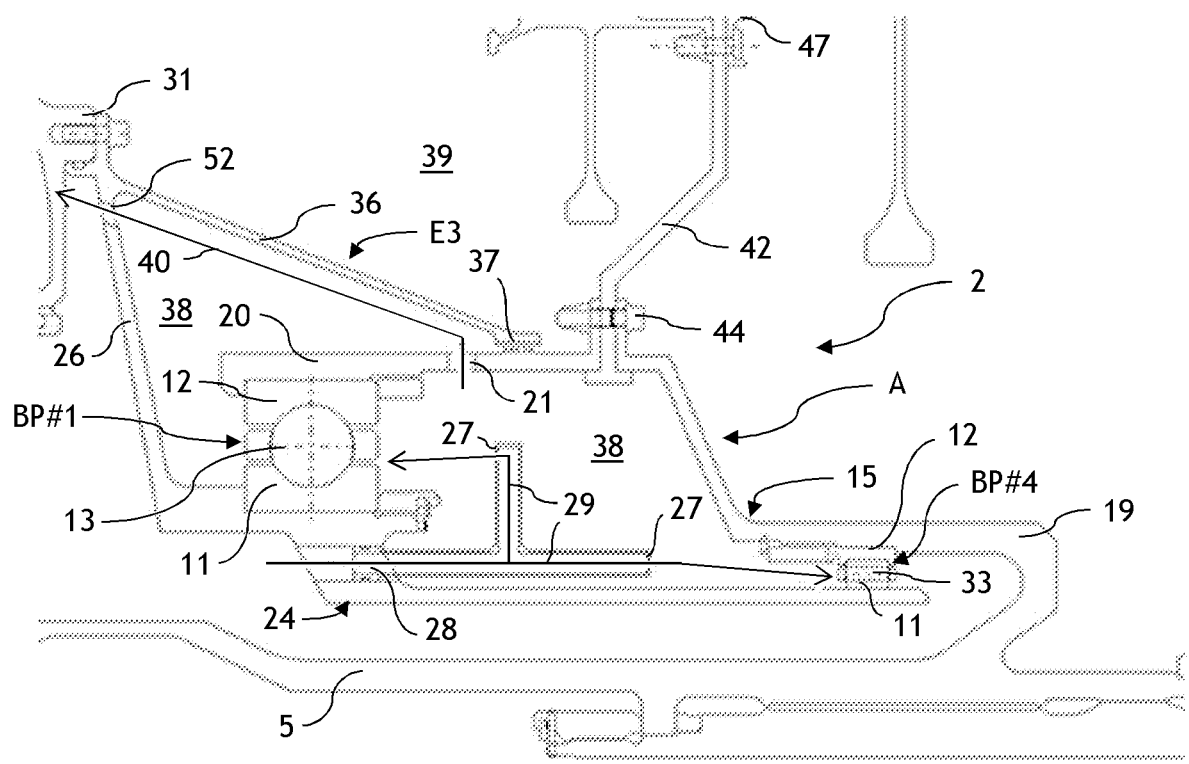
FIG. 2, a detailed schematic of an assembly of two bearings supporting a bearing connector connected to a rotor shaft according to the invention, in which the assembly is integrated into the structure of a turbojet and forms an oil circulation housing.

FIG. 2 illustrates an exemplary embodiment of an assembly 2 comprising a low-pressure shaft 5 of a low-pressure compressor supported by low-pressure bearings BP#1 and BP#4. It will be understood that the low-pressure shaft is driven by a low-pressure turbine and can drive the low-pressure compressor or both the low-pressure compressor and a reduction gear driving the fan for example.

The bearing connector 15 consists of a pin portion 19 and of a free end portion 20.

Figure 3:
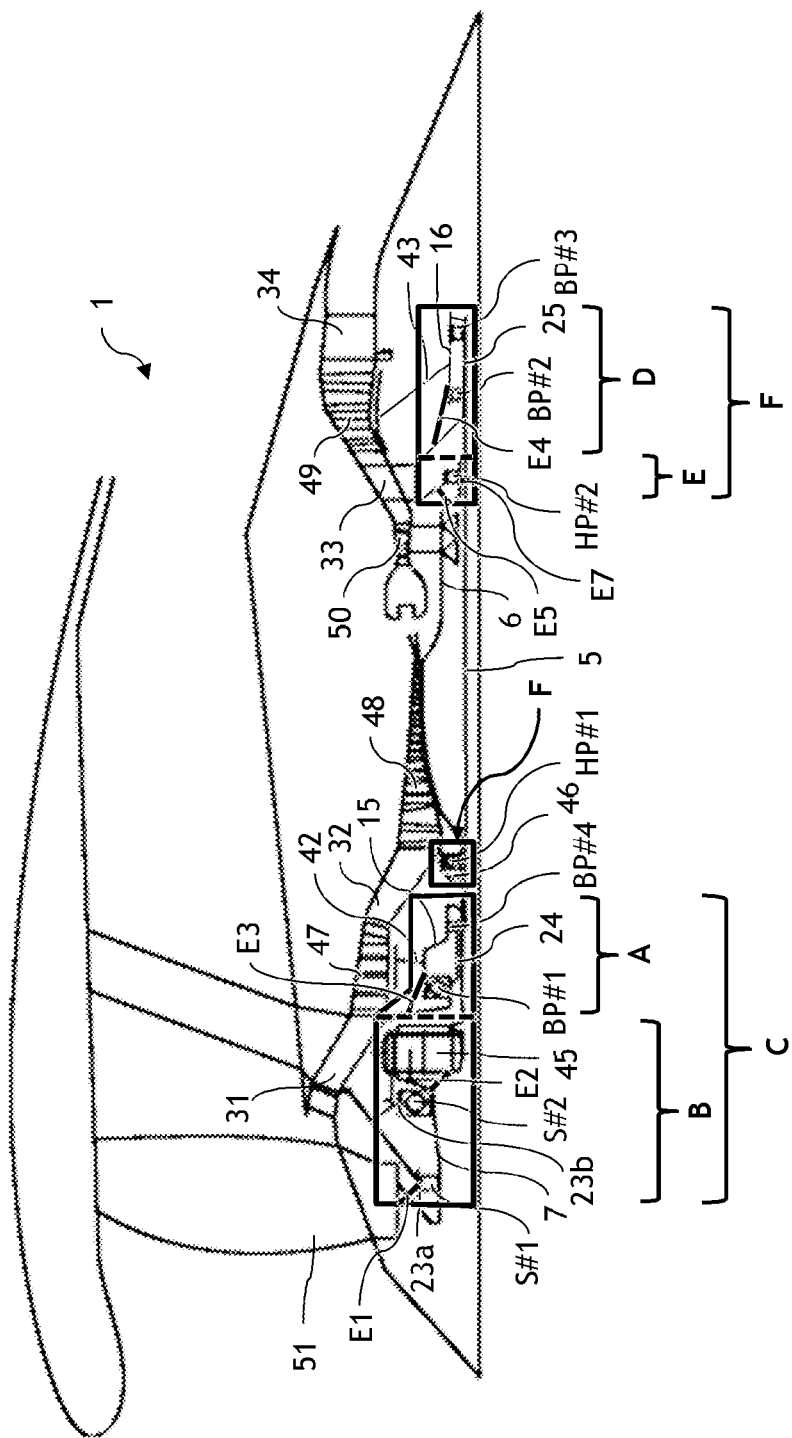
FIG. 3, a section of a turbomachine comprising several assemblies according to the invention.

With reference to FIG. 2, the bearing connector 15 of the low-pressure shaft 5 and the bearing support 24 define an oil circulation housing A common to the two low-pressure bearings BP#1 and BP#4 provided respectively with balls 13 and with rollers 33. The housing A corresponds to the housing labeled 35 on the schematic drawing of FIG. 1B in the case of a housing accommodating the low-pressure bearings BP#1 and BP#4, and is also shown in FIG. 3. The inner space of the housing A is labeled 38 in FIG. 2.

The low-pressure bearings BP#1 and BP#4 thus bathe in a fog of oil droplets.

Advantageously, the low-pressure bearing BP#1 is mounted by its external ring 12 on the free end 20 of the bearing connector 15, and the low-pressure bearing BP#4 is mounted by its external ring 12 to the pin 19 of the bearing connector 15.

The low-pressure bearings BP#1 and BP#4 are, on the other hand, mounted on the common bearing support 24 by their respective internal ring 12, said common bearing support extending substantially from the bearing BP#4 to the inlet casing 31 of the turbojet to which it is attached.

The pin 19 and the free end 20 of the bearing connector 15 of the shaft are connected to the journal 42 of the low-pressure compressor 47 where they join, preferably by means of a bolted flange 44 provided for this purpose, the journal accomplishing the coupling between the bearing connector 15 of the shaft 5 of the low-pressure compressor 47 and the low-pressure compressor 47 itself.

The common bearing support 24 accomplishes the junction between the low-pressure bearing BP#1 and the low-pressure bearing BP#4, and is continued by a flange 26 which extends radially from the inlet casing 31 to the low-pressure bearing BP#1.

Furthermore, the operation of the balls 13 and the rollers 33 of the low-pressure bearings BP#1 and BP#4 necessitates a circulation of oil inside the housing. To this end, the bearing support 24 comprises an oil inlet continued by a channel 28 allowing the oil to be carried from the inlet casing 31 to the interior of the housing. Preferably, the channel 28 is provided at the junction of the bearing support 24 and of the flange 26. Oil is injected into the balls 13 and the rollers 33 of the low-pressure bearings BP#1 and BP#4 via spray nozzles 27 provided for this purpose at the outlet of the channel 28. Oil supply is shown by the arrows 29 in FIG. 2.

The free end 20 of the bearing connector 15 is provided with a through opening forming an oil circulation channel allowing the recovery of oil having circulated in the balls 13 and the rollers 33 of the low-pressure bearings BP#1 and BP#2. The oil recovery is shown by the arrow 40 in FIG. 2.

The housing comprises a seal E3 which appears in the form of a branch 36 provided at one of the ends of a sealing means 37 connected to the free end 20 of the bearing connector. The sealing means 37 is advantageously located between the oil circulation channel 21 of the free end 20 of the bearing connector and the journal 42 of the low-pressure compressor 47. The other end of the branch 36 of the seal E3 is attached to the inlet casing 31.

The sealing means 37 is a cross section restriction between the inner space 38 of the housing within which the oil circulates, and an outer space 39 of the housing within which mainly air circulates. This sealing means 37 limits the passage of gasses and of fluids, and is pressurized by the outer space 39 of the housing. Pressurization is accomplished by bringing air compressed by the turbomachine around the oil housing, in the outer space 39, and by recovering more fluid (oil, oil fog, air) than the volume of air brought to the housing via the spray nozzles 27.

This pressurization induces the passage of an airflow from the outer space 39 toward the inner space 38 of the housing, which drives oil through the sealing means 37 toward the inner space 38 of the housing, thus allowing maximum retention of oil in said inner space 38.

The oil runs along the branch 36 of the seal of the housing and leaves the housing through the opening forming a channel 52 provided in the first branch 26 of the bearing support 24, in proximity to its attachment to the inlet casing 31, to be carried toward an oil recovery and/or treatment device.

According to a preferred embodiment of the invention, the free end 20 and the pin 19 of the connection 15 of the shaft 5, the common bearing support 24 and the flange 26, as well as the branch 36 of the housing seal appear in the form of modules designed to be assembled together in a simple and rapid manner, so as to form the assembly 1.

In accordance with what was described previously, the inner ring 11 of the rolling element bearing BP#1 is first assembled to the flange 26 of the bearing support 24. The spray nozzles 27 are then mounted in the channel 28 of the bearing support 24. This bearing support 24 assembly is mounted on the inlet casing 31, with the sealing branch 36 if it is not integral with the bearing support 24. The ball 13 and the outer ring 12 of the bearing BP#1 are then mounted to the free end 20 of the bearing connector 15. On the other side, the outer ring 12 and the roller 33 of the bearing BP#4 are assembled to the pin 19 of the bearing connector 15. The journal 42 is then mounted to the free end 20, then the assembly of the pin 19 equipped with the bearing BP#4 to the journal 42.

FIG. 3 shows a turbofan 1 integrated several assemblies described previously. The presence of these assemblies allows a reduction in the number of housings necessary for accommodating the different bearings of the turbojet. The different housings, labeled A, B, C, D, E and F, are shown schematically in FIG. 3 by frames and are delimited by the corresponding shoulders. They will be described in more detail hereafter in the present text.

The turbojet 1 comprises a low-pressure shaft 5 driven by a low-pressure turbine 49 and driving a low-pressure compressor 47, a high-pressure shaft 6 driven by a high-pressure turbine 50 and driving a high-pressure compressor 48, as well as a fan shaft 7 driving a fan 51.

As regards the upstream portion of the turbojet 1, the fan shaft 7 is supported by an upstream fan bearing S#1 and a downstream fan bearing S#2, the low-pressure shaft 5 of the low-pressure compressor 47 is supported by an upstream low-pressure bearing BP#1 and a downstream low-pressure bearing BP#4, and the high-pressure shaft 6 of the high-pressure compressor 48 is supported by an upstream high-pressure bearing HP#1 and a downstream high-pressure bearing HP#2 (the latter bearing will be described with the downstream portion of the turbojet).

The terms "low-pressure shaft of the low-pressure compressor (respectively of the low-pressure turbine)" mean that the location is the portion of the low-pressure shaft which drives the low-pressure compressor (respectively is driven by the low-pressure turbine), and that the low-pressure shaft comprises a single shaft, or two shafts of which one drives the low-pressure compressor and the other the low-pressure turbine. The same is true for the high-pressure body.

The fan bearings S#1 and S#2 on the one hand, and the low-pressure compressor bearings BP#1 and BP#4 on the other hand, are separated by a reduction mechanism 45, also called the "reduction gear," allowing a reduction in the speed of rotation of the fan 51. The fan bearings S#1 and S#2 are located upstream of the reduction mechanism 45, and the low-pressure compressor bearings BP#1 and BP#2 are located downstream of the reduction mechanism 45.

Each of the bearings S#1 and S#2 of the fan is mounted by its external ring 12 to a bearing support 23a, 23b connected to the inlet casing 31, and by its internal ring 11 to the shaft 7 of the fan 51.

The low-pressure bearings BP#1 and BP#4 are mounted to a bearing connector 15 of the shaft 5 of the low-pressure compressor 47, and to a common bearing support 24, in conformity with the schematic drawing of FIG. 1B.

The journal 42 of the low-pressure compressor 47 is connected to the bearing connector 15 of the shaft, extends radially toward the exterior of the bearing connector, and ensures coupling between said bearing connector 15 and the low-pressure compressor 47.

The common bearing support 24 of the bearings BP#1 and BP#4 is for its part connected to the inlet casing 31. Alternatively, it can be connected to the inter-compressor casing 32.

The assembly of the low-pressure bearings BP#1 and BP#4, with the bearing connector 15 of the shaft 5 of the low-pressure compressor 47 and the common bearing support 24 allows the journal 42 of the low-pressure compressor 47 to be positioned around the bearings, and thus to define a common housing C in which are accommodated said low-pressure bearings BP#1 and BP#4, the journal 42 being disposed around the housing C, as well as the fan bearings S#1 and S#2, and the reduction gear 45.

The assembly of the low-pressure bearings BP#1 and BP#4 corresponds to that of FIG. 2, and differs from the assembly shown in FIG. 1b by the absence of the seal E6. Hence the oil circulates in the entire inner volume of the housing, at the low-pressure bearings BP#1 and BP#4, the fan bearings S#1 and S#2, and the reduction gear 45.

According to a variant embodiment, the housing C is divisible into two housings A and B, where the housing A comprises the low-pressure bearings BP#1 and BP#4, and the housing B comprises the fan bearings S#1 and S#2 and the reduction gear 45. The housings A and B extend downstream and upstream respectively from the schematic separation in dotted lines.

The housing C is provided with three seals, E1, E2, E3, which mark a separation between the internal space of the housing C and neighboring air circulation zones. They allow the oil present in the housing to be prevented from penetrating into an adjoining air zone, and conversely.

The seal E1 corresponds to the separation between the shaft 7 of the fan 51 and the inlet casing 31.

The seal E2 corresponds to the separation between the shaft 7 and the fan 51 and the low-pressure shaft 5 of the low-pressure compressor 47.

The seal E3 corresponds to the separation between the low-pressure shaft 5 of the low-pressure compressor 47 and the inlet casing 31, and corresponds to the seal 37 shown in FIG. 2.

As regards the downstream portion of the turbojet 1, the low-pressure shaft 5 of the low-pressure turbine 49 is supported by an upstream low-pressure bearing BP#2 and a downstream low-pressure bearing BP#3, and the high-pressure shaft 6 of the high-pressure turbine 50 is supported by an upstream high-pressure bearing HP#1 and a downstream high-pressure bearing HP#2.

The high-pressure bearing HP#1 is located in proximity to the low-pressure bearing BP#4 and gearing 46 configured to collect power from the high-pressure shaft 6. Conventionally, the high-pressure bearing HP#1 and the gearing 46 are accommodated in a common housing F.

The invention is of course not limited to the upstream portion of the turbojet, particularly to the assembly of the low-pressure compressor as previously described, but also to other rotating assemblies of the turbomachine such as the assembly of the low-pressure turbine described hereafter in the present text. The different elements of the assembly of the low-pressure compressor which are the low-pressure bearings BP#1 and BP#4, the bearing support 24, the bearing connector 15, the journal 42, and the inlet casing 31, are then transposed with the assembly elements of the low-pressure turbine which are respectively the low-pressure bearings BP#2 and BP#3, the bearing support 25, the bearing connector 16, the journal 43 and the inter-turbine casing 33.

Furthermore, the invention can be applied to several rotating assemblies of the turbomachine.

Hence the invention can be applied for example to the low-pressure compressor, or to the low-pressure turbine, or even to both the low-pressure compressor and the low-pressure turbine of the turbomachine.

The low-pressure bearings BP#2 et BP#3 are mounted to the bearing connector 16 of the shaft 5 of the low-pressure turbine 49, and to the common bearing support 25, in conformity with the schematic drawing of FIG. 1B.

The journal 43 of the low-pressure turbine 49 is connected to the bearing connector 16 of the shaft, extends toward the exterior of the bearing connector and ensure coupling between said bearing connector 16 and the low-pressure turbine 49.

The bearing support 25 common to the bearings BP#2 and BP#3 is, for its part, connected to the inter-turbine casing 33. Alternatively, it can be connected to the exhaust casing 34.

The assembly of the low-pressure bearings BP#2 and BP#3 with the bearing connector 16 and the common bearing support 25 allows the journal 43 of the low-pressure turbine to be positioned toward the exterior of the bearings, and thus to define a common housing F in which are accommodated said low-pressure bearings BP#2 and BP#3, the journal 43 being outside of the housing F, as well as the high-pressure bearing HP#2 of the high-pressure turbine.

The assembly of the low-pressure bearings BP#2 and BP#3 corresponds to that of the low-pressure bearings BP#1 and BP#4 of FIG. 2, taking into account the transposition of the assembly elements of the low-pressure compressor for the assembly elements of the low-pressure turbine, as described previously. The housing F does not comprise any seal similar to E6 between the bearing support 25 and the low-pressure shaft 5, and thus oil circulates in the entire inner volume of the housing, at the low-pressure bearings BP#1 and BP#4, and the high-pressure bearing HP#2.

According to a variant embodiment, the housing F is divisible into two housings D and E, where the housing D comprises the high-pressure bearings BP#2 and BP#3, and the housing E comprises the high-pressure bearing HP#2 of the high-pressure turbine. The housings D and E extend downstream and upstream respectively of the schematic separation in dotted lines.

According to one variant embodiment, the low-pressure bearings BP#2 and BP#3 as well as the high-pressure bearing HP#2 of the high-pressure turbine are accommodated in a common housing E.

As illustrated by FIG. 3, the housing F is advantageously provided with one or more of the following seals E4, E5, and E7:

The seal E4 corresponds to the separation between the low-pressure shaft 5 of the low-pressure turbine 49 and the inter-turbine casing 33.

The seal E5 corresponds to the separation between the high-pressure shaft 6 of the high-pressure turbine 50 and the inter-turbine casing 33.

The seal E7 corresponds to the separation between the low-pressure shaft 5 and the high-pressure shaft 6.

The housings A, B, C, D, E, and F can be vented or non-vented.

By non-vented housing is meant here a housing which is not directly in fluid communication with the open air and which does not comprise a degassing tube. To this end, an oil recovery pump connected with a recovery port can be placed in the lowest point of the engine so as to recover the oil and the air of the non-vented housing and thus create an aspiration of air through the seals of the housing. The pump advantageously has a pumping flow rate greater than that of the oil entry into the housing, allowing the lubrication of the bearings and if necessary of the reduction gear.

By vented housing is meant here a housing capable of being put into communication with the open air while being held at a pressure close to, but greater than the atmospheric pressure to force the discharge of air. The bearings in the interior of such housings are bathed by a fog of oil which is extracted continuously from the housing by a degassing tube, the air and the oil being separated in an oil separator. In such a housing, the recovery pump has a pumping flow rate substantially equal to the oil entry into the housing (via the spray nozzles). Furthermore, it is possible to have flows of air passing through the upstream and downstream seals of the housing, said flows of air having a pressure greater than or equal to that prevailing in the housing.

In one embodiment, when the housing comprises at most two seals, the housing is preferably non-vented. Likewise, when the housing comprises more than two seals, the housing is vented.

Typically, the housing C is preferably vented, in that it comprises seals E1, E2, and E3 previously described.

REFERENCES

FR2896827

The invention claimed is:

1. An assembly for a turbomachine, comprising:
   a shaft of a rotor of a turbomachine, and
   at least two bearings allowing at least one portion of said shaft to be supported,
   wherein the assembly comprises a bearing support configured to be connected to a casing of the turbomachine and which extends between the internal rings of the bearings while being mounted thereon, as well as a bearing connector which is connected to the shaft of the rotor and which is mounted on the external rings of the bearings while extending between them, the bearing support and the bearing connector being common to the two bearings and delimiting together at least partly an oil circulation housing common to the two bearings.

2. The assembly according to claim 1, wherein the bearing connector appears in the form of a flange which extends along and around the shaft of the rotor while widening, so that the common bearing support is located between the bearing connector and the shaft of the rotor.

3. The assembly according to claim 1, wherein the bearing connector is designed to be coupled to a rotor through a journal mounted around the housing, which extends from a portion of the bearing connector located between the two bearings.

4. The assembly according to claim 1, wherein the common bearing support is configured to be connected to a casing of the turbomachine which is common to the bearings.

5. The assembly according to claim 1, wherein the bearing connector is a bearing connector of a low-pressure shaft of a low-pressure compressor of a turbomachine, and wherein the bearings are low-pressure bearings allowing said bearing connector of the low-pressure shaft of the low-pressure compressor of the turbomachine to be supported.

6. The assembly according to claim 4, wherein the bearing support is configured to be connected to a casing which is an inlet casing or an inter-compressor casing of a turbomachine.

7. The assembly according to claim 1, wherein the bearing connector is a bearing connector of a low-pressure shaft of a low-pressure turbine of a turbomachine, and wherein the bearings are low-pressure bearings allowing said bearing connector of the low-pressure shaft of the low-pressure turbine of the turbomachine to be supported.

8. The assembly according to claim 7, wherein the bearing support is configured to be connected to a casing which is an exhaust casing or an inter-turbine casing of a turbomachine.

9. The assembly according to claim 6, further comprising a reduction mechanism configured to couple the low-pressure shaft of the low-pressure compressor with the shaft of the fan, the common housing accommodating the low-pressure bearings supporting the low-pressure shaft of the low-pressure compressor, the bearing(s) of the fan supporting the fan, and the reduction mechanism.

10. The assembly according to claim 8, further comprising a high-pressure shaft of a high-pressure turbine supported by at least one high-pressure bearing, the common housing accommodating the low-pressure bearings supporting the low-pressure shaft of the low-pressure turbine and the high-pressure bearing(s) supporting the high-pressure shaft of the high-pressure turbine.

11. A turbomachine comprising an assembly according to claim 1.

12. The turbomachine according to claim 11, said turbomachine being a turbofan.

* * * * *